(12) United States Patent
Gadre et al.

(10) Patent No.: US 6,308,253 B1
(45) Date of Patent: Oct. 23, 2001

(54) RISC CPU INSTRUCTIONS PARTICULARLY SUITED FOR DECODING DIGITAL SIGNAL PROCESSING APPLICATIONS

(75) Inventors: Shirish Gadre; Mazin S. Khurshid, both of San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/283,377

(22) Filed: Mar. 31, 1999

(51) Int. Cl.[7] .......................... G06F 9/305; G06F 9/315; G06F 9/30
(52) U.S. Cl. .................. 712/41; 712/36; 712/35; 712/37; 712/224; 712/223; 709/247; 709/322; 707/101
(58) Field of Search .................... 711/150, 153, 711/217, 219; 712/343, 41.23, 200, 26, 41, 224, 35, 223, 36, 37, 42, 341, 24, 25, 21, 22, 211, 213, 43, 20, 23; 707/101; 709/247, 322; 710/53

(56) References Cited

U.S. PATENT DOCUMENTS 5,539,896 * 7/1996 Lisle ......................................... 712/43
5,572,689 * 11/1996 Gallup et al. ......................... 712/200

\* cited by examiner

Primary Examiner—Daniel H. Pan
(74) Attorney, Agent, or Firm—Wood, Herron & Evans, L.L.P.

(57) ABSTRACT

A reduced programmable controller for an extensible digital signal processing architecture supports particular instructions to facilitate common digital signal processing operations. These instructions include extract and insert instructions, which are useful in managing the storage and extraction of digital signal processing variables to and from registers, and also useful in assembling fixed-length digital signal parameters from a section of a bitstream stored in a register. These instructions further include leading value detect instructions, including a leading zero detect instruction and a leading one detect instruction which are useful in parsing unique prefix codes such as Huffman codes used in MPEG encoding of video and other variable length codes, and useful in handling of a priority encoder such as a task manager.

14 Claims, 5 Drawing Sheets

RISC CPU INSTRUCTIONS PARTICULARLY SUITED FOR DECODING DIGITAL SIGNAL PROCESSING APPLICATIONS

CROSS-REFERENCE TO RELATED APPLICATIONS

This application is related to U.S. patent application Ser. No. 09/179,147 filed Oct. 26, 1998, now U.S. Pat. No. 6,041,400, naming Taner Ozcelik et al. and entitled "DISTRIBUTED EXTENSIBLE PROCESSING ARCHITECTURE FOR DIGITAL SIGNAL PROCESSING APPLICATIONS", which is hereby incorporated by reference herein in its entirety.

FIELD OF THE INVENTION

The invention is generally related to integrated circuit device architecture, and more particularly, to an integrated circuit device architecture for use in digital signal processing applications.

BACKGROUND OF THE INVENTION

Future generations of audio/video processing circuitry will continue to have to break new ground in performance to satisfy consumers' desires for greater functionality and higher audio/video quality in consumer electronic devices such as computers, televisions, direct broadcast satellite (DBS) receivers, audio/video (A/V) receivers, digital versatile disc (DVD) players, cable set-top boxes, etc. (referred to hereinafter as A/V components). In particular, emerging standards such as the Advanced Television Systems Committee (ATSC) digital television specification, the MPEG-2 video decoding specification, the Dolby AC3 audio decoding specification, etc., have significantly raised the performance requirements for the hardware circuitry used in such devices.

Decoding is a process of retrieving information from a data stream and formatting the data in a useable form. Decoding is a form of digital signal processing (DSP), and is typically handled by dedicated DSP circuitry in an integrated circuit device, or "chip." A number of other DSP functions or operations may be used in A/V components, e.g., filtering, demultiplexing, close captioning decoding, graphics overlaying, etc.

At one time, separate DSP chips were used in a given design to implement the various digital signal processing tasks, or operations, required in an A/V component. The DSP chips were mounted on a circuit board with a main programmable controller such as a microprocessor, with electrical connections provided between the various chips to permit data to be transmitted therebetween.

However, as the performance requirements of such components have grown, and as chip manufacturing techniques have improved, a significant need has developed for a manner of integrating the functionality of multiple DSP chips onto the same integrated circuit device. The benefits of integrating multiple functions onto the same chip often include greater performance, lower design and manufacturing costs, reduced component size, and reduced power requirements, among others.

Two primary integration approaches are often used to implement multiple DSP functions on a given integrated circuit device. A first approach is a completely hardwired approach, where dedicated circuitry, typically in the format of one or more hardwired datapaths, is developed to implement each DSP function. Additional dedicated circuitry is then developed to transmit data between the various DSP functions. Typically, a hardwired approach offers the greatest performance, since circuitry may be optimized for one particular application. As a result, hardwired circuitry often minimizes memory requirements and circuit area, and maximizes circuit speed, for its given application.

The primary drawback to the hardwired approach, however, is the lack of flexibility resulting from the optimization for one particular application. A hardwired chip is typically designed and manufactured to work in one environment and to perform one specific set of functions. Upgrading or extending the functionality of a hardwired chip design often requires a complete redesign. Given that most of the cost in a chip is invested in its design, therefore, the hardwired approach can be relatively costly. Moreover, the hardwired approach typically has a relatively long development time, which can adversely affect a manufacturer's ability to respond quickly to consumer needs.

At the other end of the spectrum from the hardwired approach is the completely programmable (or software-based) approach, which, similar to a general purpose computer, attempts to support multiple applications by providing a relatively generic hardware platform that can be customized via software for use in different applications. Many software-based DSP architectures use very long instruction word (VLIW) processors, which provide extremely flexible and reconfigurable functionality for a wide variety of applications. Under this approach, the same integrated circuit device can be used to perform any number of functions merely by executing different software supplied to the device. Moreover, given that software is relatively easier and faster to design and troubleshoot than hardware, development is relatively faster and less expensive.

However, a purely software-based approach suffers from a number of drawbacks. First, using generic hardware typically requires compromises to be made to support multiple applications. As a result, many of the optimizations that might be made in a completely hardwired approach cannot be made for a software-based design. Consequently, the overall performance of a software-based design is often less optimal than a completely hardwired design.

Second, software-based designs typically require a very sophisticated compiler, a program used to convert human-readable program code into machine-readable instructions. Overall development costs and time thus increase due to the additional up-front effort and expense associated with developing the compiler.

Third, software-based designs also require a relatively sophisticated real time operating system that supports complicated scheduling of different tasks and threads. As a result, additional development efforts must be expended in this area as well, again increasing development costs and time. Furthermore, a complex multi-tasking operating system often introduces significant additional overhead, thereby further limiting performance and increasing memory requirements.

Therefore, a significant need exists for a manner of integrating DSP circuitry into an integrated circuit device to provide a better balance of development time, development expense, performance, flexibility, and upgradability.

SUMMARY OF THE INVENTION

The invention addresses these and other problems associated with the prior art by providing a circuit arrangement and method that utilize a distributed extensible processing architecture to allocate various DSP functions or operations between multiple processing cores disposed on an integrated circuit device. Each processing core includes a very small CPU, known as a programmable controller, which is a reduced instruction set (RISC) processor supporting a small number of useful instructions for digital signal processing.

Specifically, one aspect of the invention is a pair of instructions supported by the programmable controller, known as extract and insert, which are useful in managing the storage and extraction of digital signal processing variables to and from registers, and also useful in assembling fixed-length digital signal parameters from a section of a bitstream stored in a register.

The extract instruction identifies a source register, a target register, a number of bits and a starting position; in response to this instruction the identified number of bits, starting from the identified starting position, are copied from the source register to a predetermined position in the target register, e.g., a right justified position. In the specific embodiment disclosed herein, the remaining bits of the target register are cleared.

The insert instruction identifies a source register, a target register, a number of bits and a starting position; in response to this instruction the identified number of bits are copied from a predetermined position in the source register, e.g., a right justified position, to the target register, starting at the identified starting position.

A second aspect of the invention is a pair of leading value detect instructions supported by the programmable controller, including a leading zero detect instruction and a leading one detect instruction which are useful in parsing unique prefix codes such as Huffman codes used in MPEG encoding of video and other variable length codes, and useful in handling of a priority encoder such as a task manager.

The leading value detect instruction identifies a target register and a destination register; in response to this instruction the target register is evaluated to identify the position of the first bit in the target register having a predetermined binary value. In the leading zero detect instruction this predetermined binary value is 0, and in the leading 1 detect instruction this predetermined binary value is 1. The position of the first bit in the target register is written as a binary number into the destination register.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
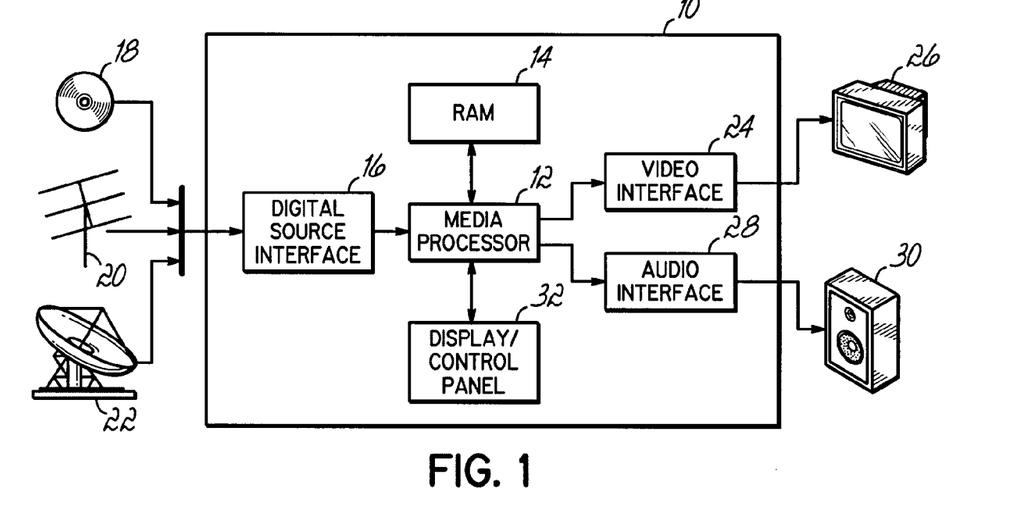
FIG. 1 is a block diagram of an audio/video component consistent with the invention.

Turning to the Drawings, wherein like numbers denote like parts throughout the several views, FIG. 1 illustrates a audio/video (A/V) component 10 consistent with the principles of the invention. Component 10 may be any of a number of components that process digital data and output audio and/or video information based thereon, including a personal or other computer, a television or television receiver, a direct broadcast satellite (DBS) receiver, an A/V receiver, a digital versatile disc (DVD) player or recorder, a cable set-top box, a video cassette recorder (VCR), a camcorder, etc.

Component 10 is under the control of a media processor 12 interfaced with a random access memory (RAM) 14 providing a portion of the working memory utilized by the processor in converting a digital data stream into audio and/or video information. A digital source interface 16 is shown receiving a digital data stream from one or more external sources, e.g., a DVD or CD 18, a digital television broadcast 20, and/or a direct broadcast satellite 22. It should be appreciated that digital source interface 16 may include any number of electronic and mechanical components suitable for retrieving a digital data stream and passing the stream to media processor 12, e.g., a laser pickup and turntable for DVD or CD information.

The digital data stream processed by media processor 12 is decoded and output as video and/or audio information. For video information, a video interface block 24 is used to interface with an external component, e.g., a television monitor 26. For audio information, such information is provided by media processor 12 to an audio interface block 28 which provides audio data for playback to a user, e.g., as represented by speaker 30.

It should be appreciated that A/V component 10 is merely representative of a wide class components suitable for processing digital multimedia information. Therefore, the invention should not be limited to the particular implementations disclosed herein.

The illustrated embodiments of the invention generally operate by distributing a plurality of digital signal processing (DSP) tasks to a plurality of processing cores configured to perform those tasks in an independent manner. The processing cores are disposed within a circuit arrangement, e.g., defining a media processor or other programmable integrated circuit device, and it should be appreciated that a wide variety of other programmable devices may implement the functionality of the cores consistent with the invention.

Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems and components utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Figure 2:
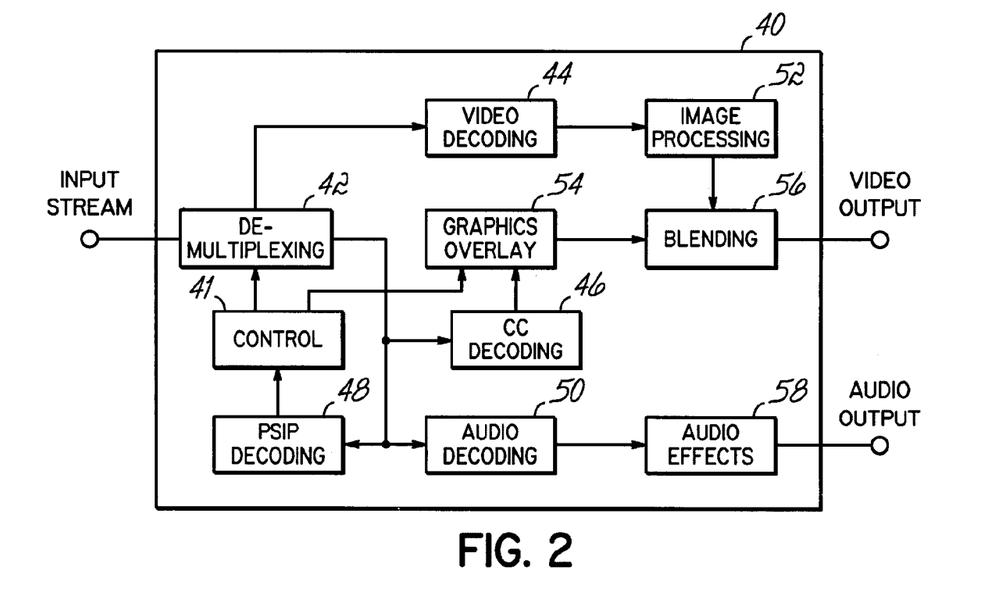
FIG. 2 is a block diagram of the principal DSP operations performed by a media processor consistent with the invention when implementing an advanced television systems committee (ATSC) receiver.

The processing cores may perform any of a number of known DSP operations to handle such tasks. For example, as shown in FIG. 2, a media processor 40 for use as a digital television receiver is illustrated. Media processor 40 is configured to comply with the Advanced Television System's Committee (ATSC) specification for digital television, which defines an MPEG-2 MP@HL video decoder, an AC3 audio decoder and a DVD-like demultiplexer as minimal components for any ATSC receiver. Additional components, such as graphics/onscreen display (OSD), high end post-filtering for decoded images, central applications, etc. may also be utilized. Also, all format decoding (AFD) must typically be addressed by an ATSC receiver.

Media processor 40 includes a control block 41 that executes a central application for controlling the overall operation of the media processor. A number of DSP tasks are then handled in blocks 42–58. Specifically, a digital input stream is fed into a demultiplexing block 42. The digital input stream is demultiplexed into several data streams, including a video data stream provided to video decoding block 44, a closed captioning data stream provided to closed captioning decoding block 46, a Program and System Information Package (PSIP) data stream provided to PSIP decoding block 48, and an audio data stream provided to an audio decoding block 50. Video decoding block 44 decodes the video information and passes the information to an image processing block 52 that performs functions such as filtering and format decoding. Any closed captioning information is decoded in block 46 and passed to a graphics overlay block 54 that overlays closed captioning text as desired, as well as any additional information such as on screen controls or displays under the control of the application executed by control block 41. The graphics overlay and video image data are blended in a blending block 56 to generate the video output signal. In addition, the audio data is decoded in block 50 and provided to block 58 to produce any audio effects, such as surround sound, reverb, etc. Block 58 then outputs an audio signal external to the processor.

It should be appreciated that a wide variety of additional DSP operations may be required in different applications, e.g., other filtering, decoding, image processing, effect processing, bit manipulation, stream parsing, and related operations.

Figure 3:
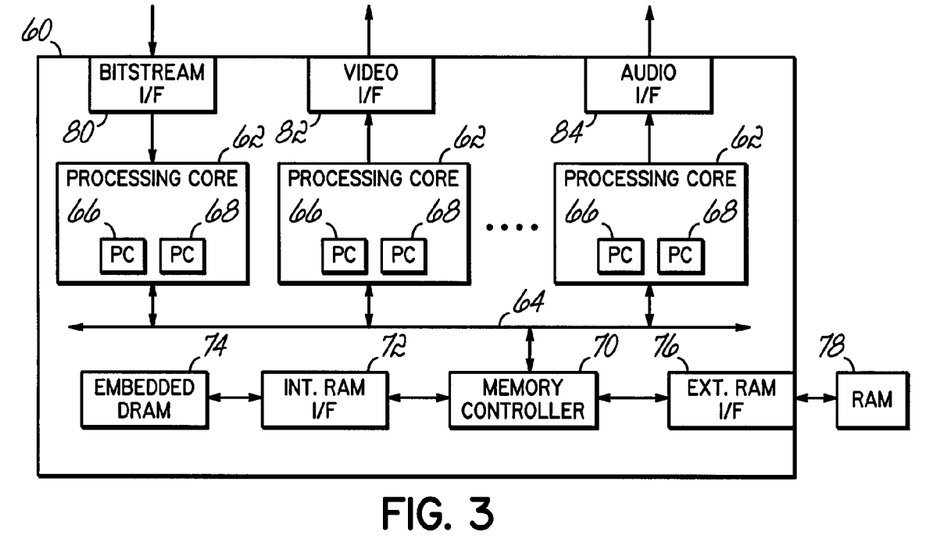
FIG. 3 is a block diagram of one implementation of the media processor in the audio/video component of FIG. 1.

As discussed above, to implement the various DSP operations necessary for a particular media application, such operations are distributed to multiple processing cores capable of operating concurrently with one another to handle the various DSP tasks. As shown in FIG. 3, for example, a media processor circuit arrangement 60 includes a plurality of processing cores 62 interfaced with one another over a communications bus 64. Each processing core includes a programmable controller (PC) 66 interfaced with one or more hardwired datapaths (DP's) 68. In addition, to support such processing cores, the cores may also be coupled to a memory subsystem, e.g., via a memory controller 70 interfaced with communications bus 64. As illustrated in FIG. 3, the memory subsystem may included embedded, or on board memory, e.g. embedded RAM 74 interfaced with memory controller 70 via an internal memory interface block 72. In addition, external memory may be supported, e.g., an external RAM 78 interfaced with memory controller 70 through an external memory interface block 76.

The configuration illustrated in FIG. 3 defines a distributed extensible processing (DXP) architecture for handling desired DSP tasks. To maximize the performance of each processing core in handling a particular task, the datapaths associated with each core are hardwired and optimized for handling a specific DSP operation. However, to simplify the media processor circuit arrangement design, as well as to facilitate code reuse, a programmable controller is utilized to control each hardwired datapath and provide an interface between cores, as well as to customize each datapath for handling particular tasks. It should be appreciated that the degree of functionality allocated between the datapaths and programmable controller in each core can vary from core to core as necessary to balance performance and extensibility for different applications.

As shown in FIG. 3, for example, different processing cores 62 are interfaced with a bitstream interface block 80, a video interface block 82 and an audio interface block 84. Other processing cores may not be coupled to any external interface. Moreover, other processing cores may be interfaced with other external components, e.g., a control panel/display.

In the illustrated embodiments, communications bus 64 is implemented using a packet-based bus protocol that supports communication between the cores as well as between individual cores and the memory subsystem, e.g., via a message passing protocol. While other communications bus implementations may be utilized in the alternative, one advantage of a message passing protocol is that cache coherence is facilitated between the various processing cores, since any internal cache within a given core need not be synchronized with cached information in other cores.

Figure 4:
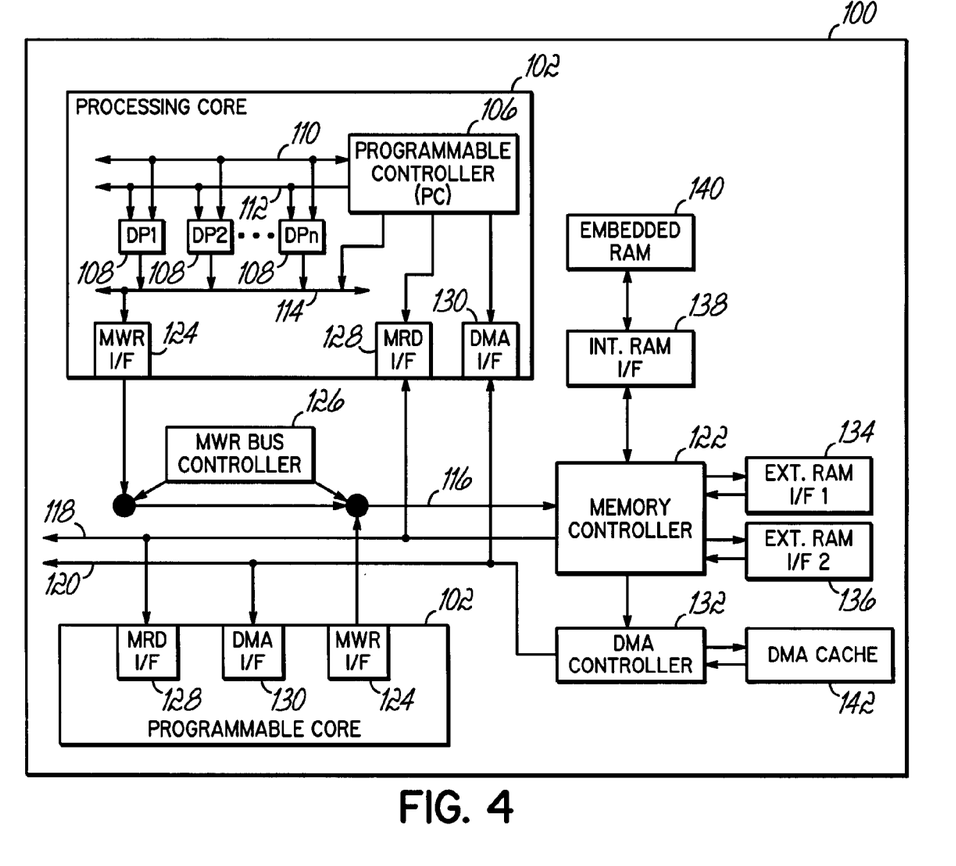
FIG. 4 is a block diagram of another implementation of the media processor in the audio/video component of FIG. 1.

FIG. 4 illustrates in greater detail another media processor circuit arrangement 100 defining a specific implementation of a media processor consistent with the invention. Specifically, media processor circuit arrangement 100 includes a plurality of processing cores 102 coupled via a communications bus 104 to a memory subsystem at 105. Each processing core includes a programmable controller 106 coupled to one or more hardwired datapaths 108. The programmable controller and hardwired datapaths are coupled to one another via a local bus (including separate data and address buses 110, 112). Output data from the core, e.g., messages to other cores and memory read and write requests, is provided via a bus 114.

As discussed above, the processing cores are connected to a bus 104 for data I/O to memory and between various cores. A number of bus architectures may be used consistent with the invention.

As one example, for digital television (DTV) applications, analysis has shown that typical memory bandwidth requirements are expected to range from about 600 MB/sec to about 1200 MB/sec. In order to support such high external memory requirements, it is envisioned that approximately 900 MB/sec to 1800 MB/sec internal bus bandwidth may be needed. Furthermore, it has been found that approximately 25% of memory bandwidth is typically occupied by WRITE operations and 75% is typically occupied by READ operations. Also, the READ bandwidth for various applications for DTV can be classified as predictable (where the access pattern is known and uniform) as opposed to random (where the access pattern is not predictable, e.g., a cache miss, motion compensation, etc.). It has been found that the distribution of predictable READ bandwidth to random READ bandwidth is typically about 40% and 35% of the total system bandwidth, respectively.

One manner of distributing the various types of bandwidth associated with DTV is shown in FIG. 4, where three separate buses provide data communications between the cores and memory, including a memory write (MWR) bus 116, a memory read (MRD) bus 118 and a direct memory access (DMA) bus 120. MWR bus 116 carries address and data packets from the cores to the memory subsystem, as well as address packets for READ requests.

In the illustrated implementation, the MWR bus 116 is a daisy chained implementation, coupling a memory controller 122 to various processing cores via MWR interface blocks 124 disposed in each core, and controlled by an MWR bus controller block 126. This is often a desirable architecture given that the MWR bus has multiple masters/drivers, and thus more flexible extensibility is supported given that the line runs between each node in the bus can be kept relatively short. A multi-drop bus may be used in the alternative for MWR bus 116, although greater care may be required to fulfill bus timing requirements in different designs.

MRD bus 118 is also coupled to memory controller 122, and random READ data is provided from the memory controller to the cores via MRD interface blocks 128 provided in each core. The DMA bus 120 carries predictable READ bandwidth from a DMA controller 132 under the control of memory controller 122. Each processing core receives the DMA data via a DMA interface block 130. In this implementation, buses 118 and 120 may be implemented as multi-drop buses, given that only one driver/master is typically required based upon the one-way data flow from the memory subsystem to the cores. Moreover, timing is not as great a concern, so excessively long line lengths to different cores in more complex designs can be broken up with intermediate repeater latches with negligible performance impact.

Selection of which of the MRD and DMA buses is used to return data to a core may be handled, for example, by the programmer of the local computer program in each core. For example, separate instructions may be defined in the instruction set for the programmable controller in each core to request that information be returned over a particular bus. In this manner, a programmer may be able to optimize bandwidth through software simulation and further "tweaking" of the resulting design.

Memory controller 122 is interfaced with an external memory via dual ports 134, 136. In addition, an internal memory, e.g., an embedded RAM 140 is interfaced with memory controller 122 via an internal RAM interface block 138. DMA controller 132 uses a unified stream cache 142 to keep latency on the DMA bus to a minimum and to provide better utilization of the external memory bandwidth. The DMA and MRD buses follow the same address/data packet format to allow for easy address decoding and broadcast features in each of the processing cores.

The DMA controller may also be configured to prefetch additional data into the stream cache in response to a DMA request, given that it is highly likely that a DMA request will be for a contiguous block of memory. To facilitate an interface between the cores and the DMA controller, it may also be desirable to utilize a separate request line from each core to the DMA controller to permit a core to initiate retrieval of another contiguous block of data over the DMA bus without having to resend a memory request over the MWR bus. Moreover, while stream cache 142 is illustrated as a unified cache, it should be appreciated that the stream cache may implement separate partitions to provide one or more dedicated channels to each core.

Figure 5:
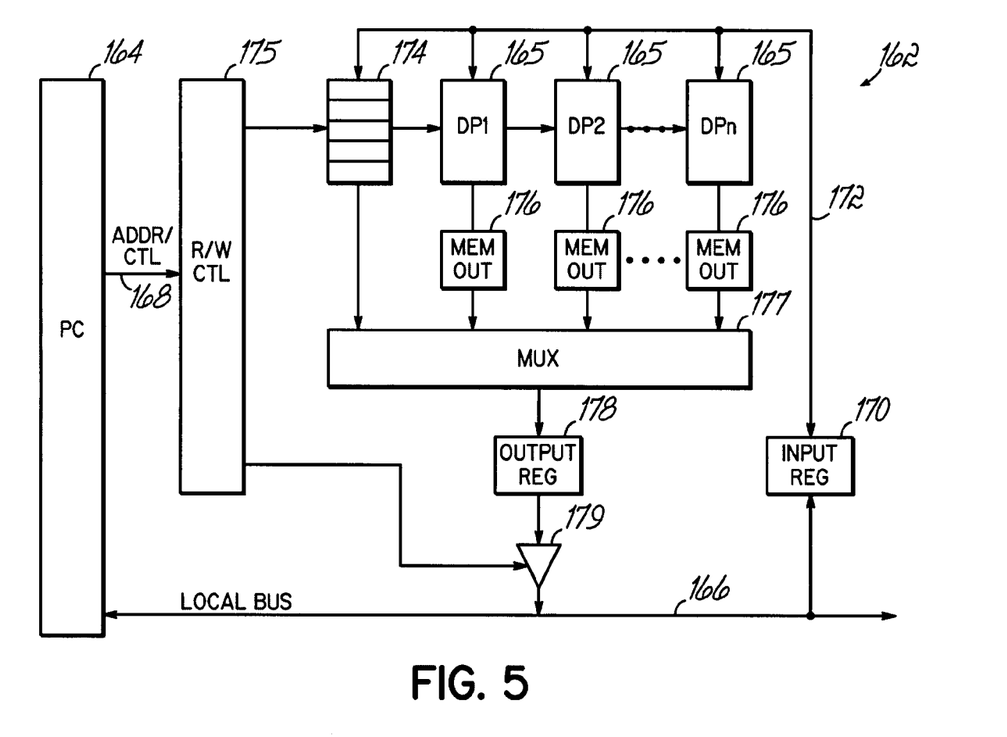
FIG. 5 is a block diagram illustrating the interface between the programmable controller and datapaths in each processing core in the media processor of FIG. 4.

Now turning to FIG. 5, one suitable manner of interfacing the programmable controller and various datapaths in each core together is shown, utilizing a coprocessor-type interface. A processing core 162 is illustrated as including a programmable controller (PC) 164 coupled to a plurality of datapaths 1 . . . n 165 via a local data bus 166 and local address bus 168. Data provided by PC 164 over local data bus 166 is received by an input register 170 and forwarded to each datapath 165 over a data bus 172. The data in input register 170 is also forwarded to a set of unit registers 174 providing a local storage space for storing control and/or status information as may be needed to interface the programmable controller with the datapaths. Control over datapaths 165 and registers 174 is provided via a read/write (R/W) control block 175 that decodes address and control information provided over local address bus 168. Typically, each datapath 165 and register 174 is allocated one or more addresses in a local address space to permit programmable controller 164 to controllably write and/or read data to and/or from each datapath and register simply by supplying the address of the appropriate datapath/register over local address bus 168.

Each datapath 165 outputs to a memory out register 176, and each register outputs to a multiplexer 177 controlled by block 175. The set of registers 174 also outputs to multiplexer 177, so that the value stored in any of registers 174, 176 can be output to an output register 178 under the control of block 175. A three-state driver 179, also under control of block 175, selectively outputs the contents of output register 178 to local data bus 166 for transmission back to PC 164.

To control each datapath with a programmable controller, it may be desirable to implement specific instructions in the instruction set of the controller. For example, it may be desirable to implement register and datapath read (or load) and write (or store) instructions, with the various registers and datapaths allocated different addresses in the local address space. It may also be desirable to use separate instructions to handle data transfers with the registers and with the datapaths. Furthermore, multiple addressing modes, e.g., direct and indirect, may also be supported using different instructions. In one suitable implementation, for example, the interface may be implemented with eight instructions, including a write register direct instruction, a write register indirect instruction, a read register direct instruction, a read register indirect instruction, a write memory (datapath) direct instruction, a write memory (datapath) indirect instruction, a read memory (datapath) direct instruction, and a read memory (datapath) indirect instruction. It should be appreciated that a wide variety of instruction formats may be used, and which is used typically will depend upon the particular architecture of the programmable controller.

A number of processor architectures may be utilized in each programmable controller. For example, in the illustrated implementation, each programmable controller is a light-weight RISC processor with emphasis for conditional execution, bit-manipulation instructions and arithmetic/logical instructions. Each controller employs a two-way set associative cache with cache locking. The cache size of each controller may be configurable depending upon the functionality of the core. In each core, the programmable controller may be capable of controlling the hardwired datapaths over the local control bus by sending vector commands, configuration information, etc.

Given the relatively limited scope of each programmable controller, as well as the distributed nature of the architecture, it is believed that the complexity of each controller, as well as the operating system executed thereby, may be substantially reduced compared to a general purpose centralized controller architecture. For example, it is envisioned that a light-weight controller, e.g., of approximately 15,000 gates or less, may be utilized for each programmable controller.

Figure 6:
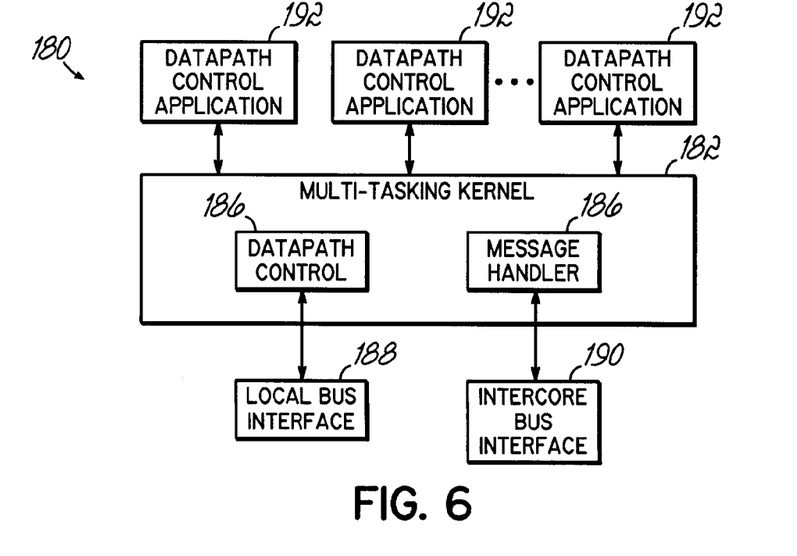
FIG. 6 is a block diagram of the software components executed by the programmable controller in each processing core in the media processor of FIG. 4.

Now turning to FIG. 6, a number of software components are executed by each programmable controller to handle the processing tasks for each processing core. These components are illustrated as executing on a programmable controller 180.

To facilitate the high-level programming language in rapid application development, a dedicated operating system/kernel 182 provides the system program code for controlling the datapaths in the core (illustrated by datapath component 184) and for handling inter-core and core-to-memory communication (represented by message handler component 186). The operating system/kernel in the illustrated embodiment is multi-tasking in nature, and may implement any other known operating system variations and techniques as appropriate. The datapath control component 184 relies on low-level interface routines that drive the local bus, as represented by component 188. Moreover, low-level routines are also provided in an inter-core (communications) bus interface component 190 utilized by message handler component 186.

Over this set of system codes execute one or more datapath control applications 192, representing the local computer programs executed by each programmable controller. The precise language and instruction set used for each datapath control application will vary depending upon the underlying operating system upon which each application executes.

While custom program code may be executed on each programmable controller, it may be seen that by utilizing a set of generic system code via an operating system/kernel in low-level support services, the design, development, verification and testing of the datapath control applications is greatly facilitated.

Figure 7A:
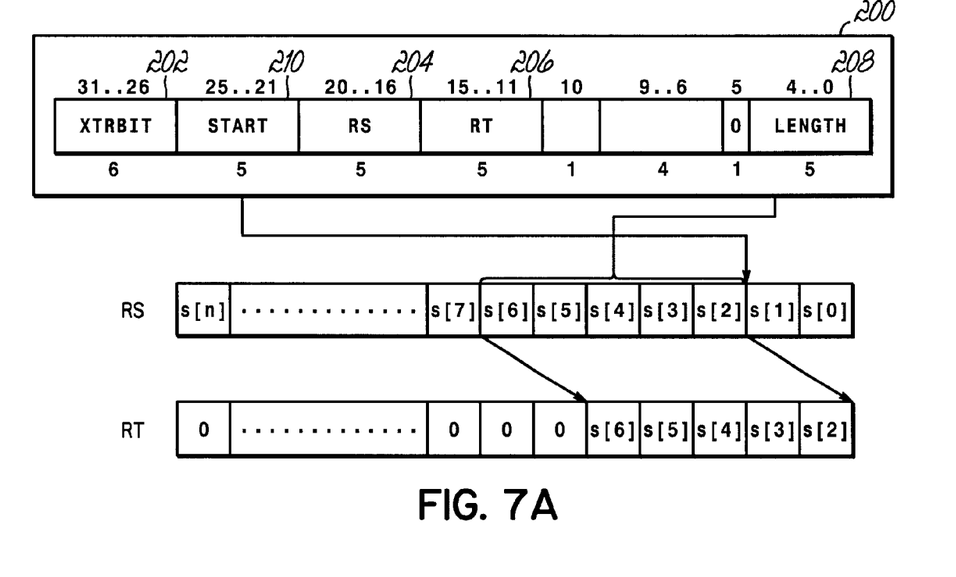
FIGS. 7A and 7B are instruction and data flow diagrams illustrating operations performed by an XTRBIT instruction and a INSBIT instruction.

Referring now to FIG. 7A, an explanation can be provided of operations performed by programmable controller 164 on unit registers 174 in response to an extract instruction XTRBIT. As seen in FIG. 7A, the extract instruction 200, which is identified by an opcode 202, includes a field 204 identifying a source register RS, a field 206 identifying a target register RT, a field 208 identifying a number of bits and a field 210 identifying a starting position. In response to this instruction, the programmable controller operates upon the identified registers 174, to cause the number of bits identified in field 208, starting from the starting position identified in field 210, to be copied from the source register RS to a right-justified position in the target register RT. The remaining bits of the target register RT are cleared. Register RS is left unchanged.

As can be seen in FIG. 7A, one example of this operation is illustrated where the value in field 210 is 2 and the value in field 208 is 5. Under these conditions, five bits s[2] through s[6] are extracted from register RS and copied to the five least significant bit positions in register RT.

Figure 7B:
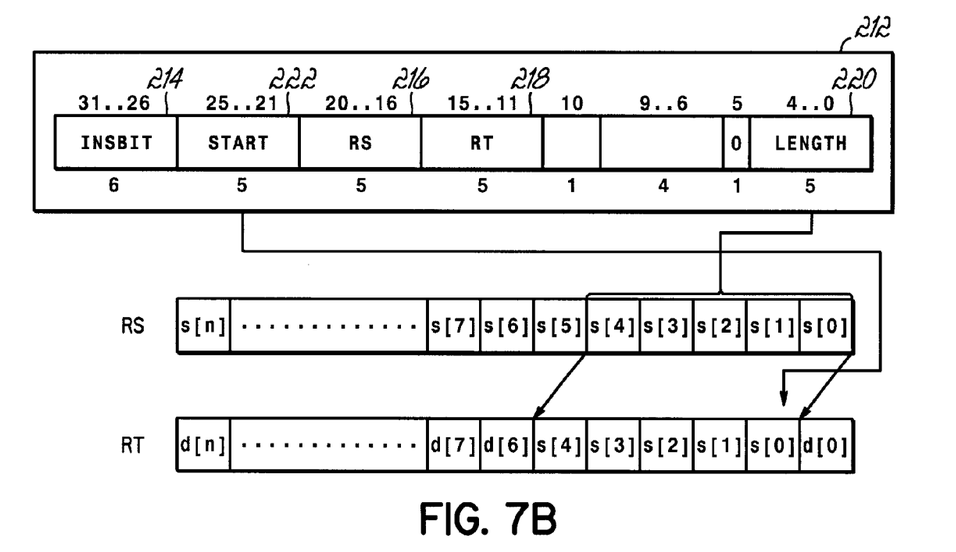

Referring now to FIG. 7B, an explanation can be provided of operations performed by programmable controller 164 on unit registers 174 in response to an insert instruction INSBIT. As seen in FIG. 7B, the insert instruction 212, which is identified by an opcode 214, includes a field 216 identifying a source register RS, a field 218 identifying a target register RT, a field 220 identifying a number of bits and a field 222 identifying a starting position. In response to this instruction, the programmable controller operates upon the identified registers 174, to cause the number of bits identified in field 220, starting from the least significant bit of register RS, to be copied to target register RT, starting from the starting position identified in field 222. The remaining bits of the target register RT are unchanged. Register RS is left unchanged.

As can be seen in FIG. 7A, one example of this operation is illustrated where the value in field 222 is 1 and the value in field 220 is 5. Under these conditions, five bits s[0] through s[4] are copied from register RS and inserted into the bit positions 1:5 in register RT.

The extract and insert instructions are included in the instruction set of the programmable controller because they are particular useful in digital signal processing. Specifically, digital signal processing typically requires that multiple processing variable values be stored and repeatedly referenced by the programmable controller. These variable values will therefore be stored into registers. Because the number of registers is limited, it is advantageous to store multiple fixed-length variable values into a single register. While this approach saves space, it can substantially delay the process of extracting a variable for analysis or saving a new variable value. These difficulties are avoided through the use of the extract and insert instructions. To extract a variable from a multi-variable register, the extract instruction may be used to move only the bits for the variable into another register, in a right justified position, where the bits can be readily analyzed. To return a modified variable to a multi-variable register, the insert instruction can be used to insert the modified variable value into the multi-variable register at the desired mid-register location.

The extract and insert instructions are also useful in assembling fixed-length digital signal parameters from a section of a bitstream stored in a register. Often in digital signal processing, portions of a bitstream storing fixed length parameters, are retrieved in 32- or 64-bit words and placed into registers of the programmable controller for analysis. It is then necessary to extract the individual parameters from the 32- or 64-bit word. This can be readily done using the extract instruction, to extract only those bits for a desired parameter from the 32-bit word, placing the parameter, right justified, into another register where the parameter can be analyzed.

A second common operation involves reconstructing a parameter that extends over a 32-bit word boundary. For example, the more significant bits of a parameter may be received in one 32-bit word and stored in a first register, and the less significant bits of the parameter may be received in a later 32-bit word and stored in a second register. In this case, the more significant bits of the parameter are found at the least significant end of the first register, and the less significant bits of the parameter are found at the most significant end of the second register. In this situation, reassembly of the parameter into a single register can be a complex operation. However, the extract and insert instructions substantially simplify this operation. Specifically, the extract instruction can be used to extract the less significant bits of the parameter from the most significant end of second register, and place these bits in a third register in a right-justified position. Then the insert instruction can be used to copy the more significant bits of the parameter from the least significant end of the first register into the third register at a position adjacent to the bits copied by the extract instruction. The complete parameter is then assembled and right justified in the third register, ready for analysis.

Figure 8A:
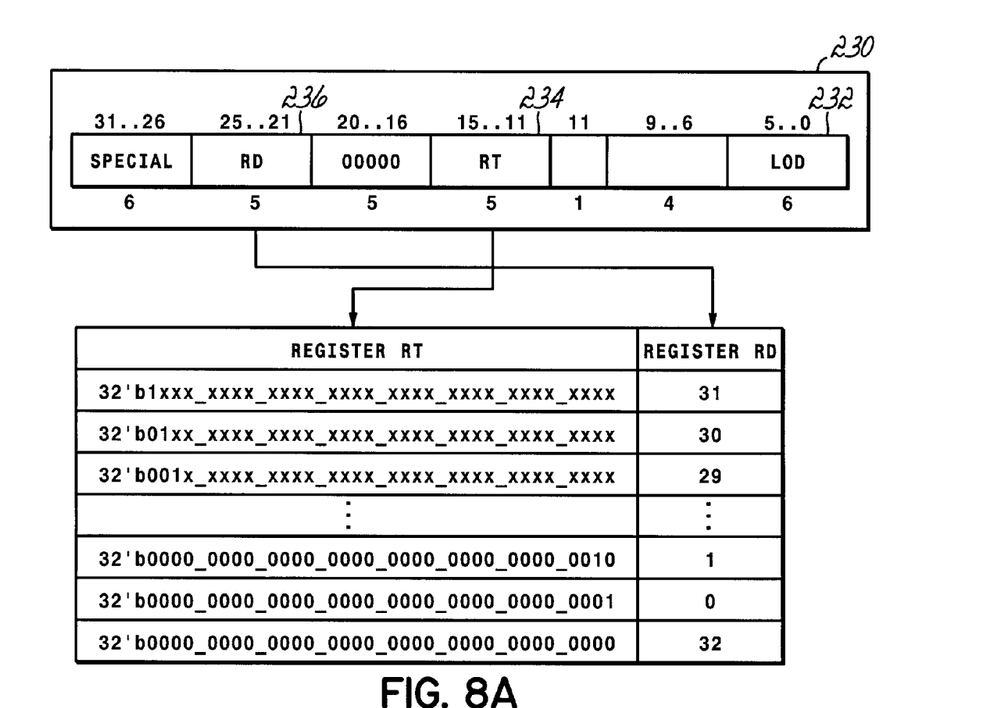
FIGS. 8A and 8B are instruction and truth table diagrams illustrating operations performed by a LOD instruction and a LZD instruction.

Referring now to FIG. 8A, an explanation can be provided of operations performed by programmable controller 164 on unit registers 174 in response to an leading one detect instruction LOD. As seen in FIG. 8A, the LOD instruction 230, which is identified by an opcode 232, includes a field 234 identifying a target register RT and a field 236 identifying a destination register RD. In response to this instruction, the programmable controller operates upon the identified registers 174, to identify the position in register RT, of the leftmost "1" valued bit, and store into register RD, the location of this leftmost "1" valued bit. Register RT is left unchanged.

As can be seen in FIG. 8A, the truth table for this operation shows that if the most significant bit of register RT has a "1" value, then the value stored into register RD is the binary value 31. If the most significant bit of register RT has a "0" value but the second most significant bit of register RT has a "1" value, then the value stored into register RD is the binary value 30. If all bits in register RT have a "0" value, then the value stored into register RD is the binary value 32.

Figure 8B:
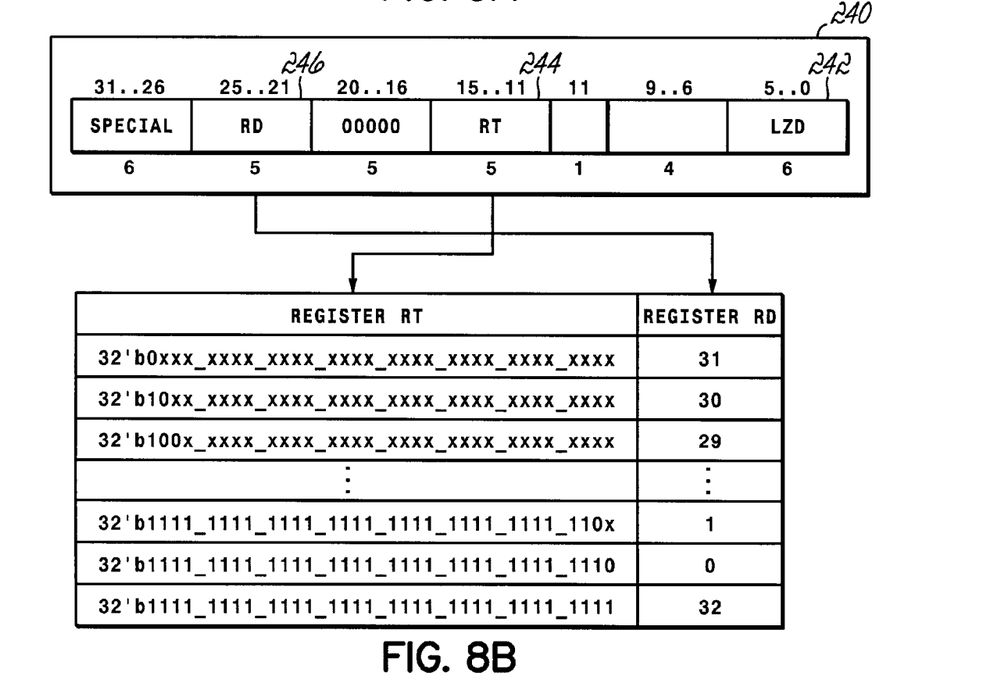

Referring now to FIG. 8B, an explanation can be provided of operations performed by programmable controller 164 on unit registers 174 in response to an leading zero detect instruction LZD. As seen in FIG. 8B, the LZD instruction 240, which is identified by an opcode 242, includes a field 244 identifying a target register RT and a field 246 identifying a destination register RD. In response to this instruction, the programmable controller operates upon the identified registers 174, to identify the position in register RT, of the leftmost "0" valued bit, and store into register RD, the location of this leftmost "0" valued bit. Register RT is left unchanged.

As can be seen in FIG. 8B, the truth table for this operation shows that if the most significant bit of register RT has a "0" value, then the value stored into register RD is the binary value 31. If the most significant bit of register RT has a "1" value but the second most significant bit of register RT has a "0" value, then the value stored into register RD is the binary value 30. If all bits in register RT have a "1" value, then the value stored into register RD is the binary value 32.

These leading value detect instructions are useful in parsing unique prefix codes such as Huffman codes, used in MPEG encoding of video, and other variable length codes. Variable length codes typically include a number of leading "0" or "1" bits, followed by scattered 0 and 1 values. Parsing of a code can be made substantially more efficient if the number of leading "0" or "1" bits in the code can be rapidly determined, because doing so will identify the code as one of a subset of codes having that number of leading "0" or "1" bits. After the code is identified as a member of a subset of codes, then the remaining bits of the code can be evaluated, e.g., by bit mask comparisons, to determine an matching codes in the subset. This process is substantially faster than, for example, comparing the code to bit masks for every available code. The leading value detect instruction can thus be used to identify, in a single instruction, a subset of codes in which a current code belongs, thus speeding the identification of a code.

Leading value detect instructions are also useful in handling of a priority encoder such as a task manager. In a priority encoder application, often a register is used to hold a number of "task flags", each representing a task that is scheduled to be performed. The tasks are prioritized, so that higher priority tasks are performed before lower priority tasks. Often, the location of the bit for a task corresponds to its relative priority: for example, the flag for a higher priority tasks is placed in a more significant position in the task flag register than the flag for a lower priority task. When this approach is taken, the most significant set task flag must be identified to determine which task should be performed. A single LOD instruction can be used for this purpose: the result of an LOD instruction using the task flag register as a target register, will be a binary number in the destination register providing the number of the highest priority set task flag. This number can then be used to immediately branch to execution of the task associated with the set task flag.

Various modifications may be made to the illustrated embodiments without departing from the spirit and scope of the invention. Therefore, the invention lies in the claims hereinafter appended.

What is claimed is:

1. An integrated circuit device circuit arrangement for processing multimedia data, the circuit arrangement comprising a processing core including:
    (1) a datapath configured to perform a predetermined digital signal processing (DSP) operation;
    (2) unit registers for storing data used in digital signal processing; and
    (3) a programmable controller coupled to the datapath and unit registers, the programmable controller configured to execute a local computer program comprising instructions to control the operation of the datapath to process data, the programmable controller responding to an extract instruction identifying a source register of said unit registers, a target register of said unit registers, a number of bits and a starting position, by copying the identified number of bits, starting from the identified starting position, from the identified source register of said unit registers to a predetermined position in the identified target register of said unit registers.

2. The integrated circuit device of claim 1 wherein said predetermined position is a right justified position.

3. The integrated circuit device of claim 1 wherein said programmable controller further causes bits of the identified target register of said unit registers not copied from the identified source register of said unit registers to be reset to a predetermined value.

4. The integrated circuit device of claim 3 wherein said predetermined value is a zero value.

5. An integrated circuit device circuit arrangement for processing multimedia data, the circuit arrangement comprising a processing core including:
    (1) a datapath configured to perform a predetermined digital signal processing (DSP) operation;
    (2) unit registers for storing data used in digital signal processing; and
    (3) a programmable controller coupled to the datapath and unit registers, the programmable controller configured to execute a local computer program comprising instructions to control the operation of the datapath to process data, the programmable controller responding to an insert instruction identifying a source register of said unit registers, a target register of said unit registers, a number of bits and a starting position, by copying the identified number of bits from the identified source register of said unit registers, starting from a predetermined position in the identified source register of said unit registers, to the identified target register of said unit registers, starting at the identified starting position.

6. The integrated circuit device of claim 5 wherein said predetermined position is a right justified position.

7. The integrated circuit device of claim 5 wherein bits of the identified target register of said unit registers not copied from the identified source register of said unit registers are not changed.

8. An integrated circuit device circuit arrangement for processing multimedia data, the circuit arrangement comprising a processing core including:

(1) a datapath configured to perform a predetermined digital signal processing (DSP) operation;

(2) unit registers for storing data used in digital signal processing; and (3) a programmable controller coupled to the datapath and unit registers, the programmable controller configured to execute a local computer program comprising instructions to control the operation of the datapath to process data, the programmable controller responding to a leading value detect instruction identifying a target register of said unit registers and a destination register of said unit registers, by identifying the position of a bit closest to a predetermined end of the identified target register of said unit registers which has a predetermined binary value, and writing an indication of the identified position into the identified destination register of said unit registers.

9. The integrated circuit device of claim 8 wherein said leading value detect instruction is a leading zero detect instruction, and said predetermined binary value is 0.

10. The integrated circuit device of claim 9 wherein said predetermined end of the identified target register of said unit registers is a most significant end.

11. The integrated circuit device of claim 8 wherein said leading value detect instruction is a leading one detect instruction, and said predetermined binary value is 1.

12. The integrated circuit device of claim 11 wherein said predetermined end of the identified target register of said unit registers is a most significant end.

13. The integrated circuit device of claim 8 wherein the identified position is written as a binary number into the identified destination register of said unit registers.

14. The integrated circuit device of claim 13 wherein the binary number is written at a least significant end of the identified destination register of said unit registers, and all other bits of the identified destination register of said unit registers are cleared.

* * * * *

UNITED STATES PATENT AND TRADEMARK OFFICE
CERTIFICATE OF CORRECTION

PATENT NO.    : 6,308,253 B1                                             Page 1 of 1
DATED         : October 23, 2001
INVENTOR(S)   : Shirish Gadre et al.

It is certified that error appears in the above-identified patent and that said Letters Patent is hereby corrected as shown below:

<u>Column 4,</u>
Line 44, delete "class components", insert -- class of components --.

<u>Column 6,</u>
Line 6, delete "may included embedded", insert -- may include embedded --.

<u>Column 10,</u>
Line 26, delete "are particular useful", insert -- are particularly useful --.

<u>Column 11,</u>
Line 63, delete "determine an matching", insert -- determine a matching --.

<u>Column 12,</u>
Line 12, delete "tasks is", insert -- task is --.

Signed and Sealed this

Ninth Day of May, 2006

JON W. DUDAS
*Director of the United States Patent and Trademark Office*